(12) United States Patent
Lunderskov et al.

(10) Patent No.: US 9,605,405 B2
(45) Date of Patent: Mar. 28, 2017

(54) SNUBBER FOR MACHINE

(71) Applicant: Caterpillar Global Mining LLC, Oak Creek, WI (US)

(72) Inventors: Kim G. Lunderskov, East Troy, WI (US); Daniel E. Bozich, Milwaukee, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 118 days.

(21) Appl. No.: 14/341,872

(22) Filed: Jul. 28, 2014

(65) Prior Publication Data

US 2016/0024745 A1 Jan. 28, 2016

(51) Int. Cl.
*E02F 3/407* (2006.01)
*E02F 9/22* (2006.01)
(Continued)

(52) U.S. Cl.
CPC .......... *E02F 3/4075* (2013.01); *E02F 9/2207* (2013.01); *E02F 9/2271* (2013.01); *F15B 21/008* (2013.01); *F16F 7/1022* (2013.01)

(58) Field of Classification Search
CPC ..... E02F 9/10; E02F 9/103; E02F 9/14; E02F 9/145; E02F 9/187; E02F 9/22; E02F 9/2207; E02F 9/2214; E02F 9/2271; E02F 3/4075; E02F 3/40; E02F 3/407; F16F 7/1022; F15B 21/008
(Continued)

(56) References Cited

U.S. PATENT DOCUMENTS 1,821,499 A 9/1931 Culver
3,092,083 A * 6/1963 Sheppard ............... B62D 5/061
                                                180/427
(Continued)

FOREIGN PATENT DOCUMENTS

GB          184906       8/1922
JP          H10102958    4/1998
WO          9741312      11/1997

OTHER PUBLICATIONS

Steel Founders' Society of America, "Snubber Arm for the Dipper Door Control on Mining Shovels", Catalog, Sep. 2011, 30 pages, Crystal Lake, Illinois.
(Continued)

*Primary Examiner* — Thomas B Will
*Assistant Examiner* — Jessica H Lutz

(57) ABSTRACT

A snubber for a machine includes a housing, a shaft and a pinion that is coupled to the shaft. The housing is mounted on an implement of the machine. The shaft is rotatably received within the housing and operatively coupled to a movable component of the implement. The snubber also includes a cylinder defining a cavity, a piston slidably received within the cylinder, a rack coupled to the piston, and a hydraulic device. The cylinder is at least partly disposed within the housing. The piston divides the cavity of the cylinder into a first chamber and a second chamber. The rack engages with the pinion to convert a rotation of the shaft into a linear movement of the piston. The hydraulic device is in fluid communication with the cavity and controls a flow of fluid between the first chamber and the second chamber to oppose rotation of the shaft.

20 Claims, 6 Drawing Sheets

(51) Int. Cl.
*F16F 7/10* (2006.01)
*F15B 21/00* (2006.01)

(58) Field of Classification Search
USPC .................................. 37/442–445; 74/89.23
See application file for complete search history.

(56) References Cited

U.S. PATENT DOCUMENTS

| | | | | |
|---|---|---|---|---|
| 3,195,575 A * | 7/1965 | Sheppard | ............... | B62D 5/087 |
| | | | | 137/625.48 |
| 3,809,186 A * | 5/1974 | Suozzo | ................... | F16L 3/202 |
| | | | | 188/129 |
| 3,834,283 A * | 9/1974 | Beichel | .................. | F15B 15/02 |
| | | | | 74/89.35 |
| 3,906,837 A * | 9/1975 | Sheppard | ................. | B62D 5/24 |
| | | | | 91/378 |
| 3,916,730 A * | 11/1975 | Sheppard | ................ | F15B 13/10 |
| | | | | 180/427 |
| 3,983,965 A * | 10/1976 | Wright, Jr. | ............ | F16F 7/1022 |
| | | | | 188/129 |
| RE29,221 E * | 5/1977 | Yang | ..................... | F16F 7/1022 |
| | | | | 188/378 |
| 4,054,186 A * | 10/1977 | Banks, Jr. | ............... | F16L 3/202 |
| | | | | 188/184 |
| 4,103,760 A * | 8/1978 | Yang | ..................... | F16F 7/1022 |
| | | | | 188/134 |
| 4,105,098 A * | 8/1978 | Klimaitis | .............. | F16F 7/1022 |
| | | | | 188/134 |
| 4,286,693 A | 9/1981 | Sulzer | | |
| 4,346,793 A * | 8/1982 | Fuse | ..................... | F16F 7/1022 |
| | | | | 188/134 |
| 4,431,093 A * | 2/1984 | Yang | ..................... | F16F 7/1022 |
| | | | | 188/129 |
| 4,517,756 A | 5/1985 | Olds et al. | | |
| 5,090,521 A * | 2/1992 | Miura | ..................... | F16D 35/00 |
| | | | | 16/277 |
| 5,469,647 A * | 11/1995 | Profio | .................. | E02F 3/4075 |
| | | | | 37/398 |
| 5,497,858 A * | 3/1996 | Cloud | ..................... | G21D 1/02 |
| | | | | 188/67 |
| 5,613,308 A * | 3/1997 | Little | .................... | E02F 3/4075 |
| | | | | 16/375 |
| 5,735,067 A | 4/1998 | Isley et al. | | |
| 5,815,960 A * | 10/1998 | Soczka | ................. | E02F 3/4075 |
| | | | | 16/86 B |
| 5,816,594 A * | 10/1998 | Howard | ................ | B62D 7/224 |
| | | | | 280/89.13 |
| 5,842,537 A * | 12/1998 | Pfeifer | ...................... | B62D 5/22 |
| | | | | 180/428 |
| 6,065,561 A * | 5/2000 | Howard | .................... | B62D 1/16 |
| | | | | 180/441 |
| 6,219,946 B1 | 4/2001 | Soczka | | |
| 6,341,933 B1 * | 1/2002 | Gagnon | ................... | E02F 3/407 |
| | | | | 37/411 |
| 6,575,264 B2 * | 6/2003 | Spadafora | .............. | B62D 5/062 |
| | | | | 180/417 |
| 6,616,117 B2 * | 9/2003 | Gryp | ....................... | B60N 2/501 |
| | | | | 248/421 |
| 6,655,494 B2 * | 12/2003 | Menjak | .................. | B62D 6/003 |
| | | | | 180/444 |
| 6,871,562 B2 * | 3/2005 | Tropper | ..................... | B62D 5/12 |
| | | | | 277/579 |
| 7,096,610 B1 | 8/2006 | Gilmore | | |
| 7,374,011 B2 * | 5/2008 | Ishikawa | ................ | B62D 5/062 |
| | | | | 180/414 |
| 8,590,180 B2 | 11/2013 | Hren et al. | | |
| 2002/0096405 A1* | 7/2002 | Gasser | ................. | A47B 88/047 |
| | | | | 188/82.1 |
| 2008/0156132 A1* | 7/2008 | Pachov | .................... | B66D 1/14 |
| | | | | 74/425 |
| 2010/0154130 A1* | 6/2010 | Han | ....................... | D06F 37/203 |
| | | | | 8/158 |
| 2011/0239494 A1 | 10/2011 | Dube et al. | | |
| 2012/0126053 A1 | 5/2012 | Christensen et al. | | |
| 2013/0192101 A1 | 8/2013 | Gilmore et al. | | |
| 2014/0007468 A1 | 1/2014 | Gross et al. | | |

OTHER PUBLICATIONS

Moog Flo-Tork, "Rotary Actuators—Imagine A World Where Your Critical Service Actuation Problems Are Solved", Article, <www.FT.MOOG.COM> Retrieved May 21, 2014, 40 pages, ACT-125-2009, Orrville, Ohio.

* cited by examiner

SNUBBER FOR MACHINE

TECHNICAL FIELD

The present disclosure relates to a snubber for a machine, and more specifically to the snubber for an implement of the machine.

BACKGROUND

Machines such as, rope shovels typically include an implement, such as a dipper, for loading and unloading materials. The dipper may include a door that closes a rear of the dipper to hold the materials that are loaded into the dipper. Further, the door is opened to unload the contents of the dipper at a desired location. The door may be typically held closed by a latch mechanism. The latch mechanism may be released to allow the door to swing open under its own weight and the weight of the contents of the dipper. The door may be re-latched as the door rotates back in preparation for its next loading cycle.

During the swinging movement, the door may tend to hit against walls of the dipper or any other proximal component. Sudden opening and closing of the door may also damage components associated with the door. Typically, dippers may be equipped with a braking device on the door linkage to reduce a swing speed as the door swings towards an open and/or closed position.

Conventional dipper door braking devices may utilize a dry friction to provide a braking force. As the door swings open or closed by virtue of its own weight, the braking device provides friction thereby reducing the swing speed of the door. However, the braking force provided by the braking device tends to reduce as the braking device wears. To maintain the necessary braking force, the braking devices may be subjected to regular maintenance, resulting in machine downtime.

An example of another conventional dipper door braking device can be found in U.S. Pat. No. 4,286,693 (hereinafter referred to as the '693 patent). The '693 patent discloses a mechanical, seismic-shock-absorbing snubber adapted to accept extremely high impact loads that may be imposed upon it by reason of its interposition between heavy, relatively moveable structures. The snubber of the '693 patent employs an escapement wheel as its damping mechanism. The wheel rotates in response to a relative movement of the structures between which the snubber is interposed and employs a cooperating, pivoted, pallet member of predetermined effective mass driven by the escapement wheel into oscillation. It is the oscillation of the pallet member, the rate of which is limited by the pallet member's mass and natural period of oscillation that restricts or damps the velocity and acceleration of relative motion between the structures with which the snubber is associated.

SUMMARY OF THE DISCLOSURE

In one aspect of the present disclosure, a snubber for a machine is provided. The snubber includes a housing, a shaft and a pinion. The housing is configured to be mounted on an implement of the machine. The shaft is rotatably received within the housing and operatively coupled to a movable component of the implement. Further, the pinion is coupled to the shaft. The snubber also includes a cylinder defining a cavity therein, a piston, a rack and a hydraulic device. The cylinder is at least partly disposed within the housing. The piston is slidably received within the cylinder and divides the cavity of the cylinder into a first chamber and a second chamber. The rack is coupled to the piston and is configured to engage with the pinion to convert a rotation of the shaft into a linear movement of the piston. The hydraulic device is in fluid communication with the cavity of the cylinder. Further, the hydraulic device is configured to control a flow of a fluid between the first chamber and the second chamber to oppose the rotation of the shaft.

In another aspect of the present disclosure, a dipper system for a machine is provided. The dipper system includes a dipper body, a dipper door and a snubber. The dipper door is coupled to the dipper body and is configured to move between an open position and a closed position. Further, the snubber is disposed on the dipper body. The snubber includes a housing, a shaft and a pinion. The housing is configured to be mounted on an implement of the machine. The shaft is rotatably received within the housing and operatively coupled to the dipper door. Further, the pinion is coupled to the shaft. The snubber also includes a cylinder defining a cavity therein, a piston, a rack and a hydraulic device. The cylinder is at least partly disposed within the housing. The piston is slidably received within the cylinder and divides the cavity of the cylinder into a first chamber and a second chamber. The rack is coupled to the piston and is configured to engage with the pinion to convert a rotation of the shaft into a linear movement of the piston. The hydraulic device is in fluid communication with the cavity of the cylinder. Further, the hydraulic device is configured to control a flow of a fluid between the first chamber and the second chamber to oppose the rotation of the shaft.

In yet another aspect of the present disclosure, a method of damping a movement of a dipper door is provided. The method includes receiving a shaft rotatably within a housing. The shaft is operatively coupled to the dipper door. The method also includes coupling a pinion to the shaft. The method further includes providing a piston slidably within a cavity of a cylinder. The piston divides the cavity of the cylinder into a first chamber and the second chamber. The method further includes coupling a rack to the piston and transmitting the movement of the dipper door to the shaft. The method also includes engaging the rack with the piston to convert a rotation of the shaft into a linear movement of the piston. The method includes controlling a flow of a fluid from the first chamber of the cylinder to the second chamber of the cylinder to oppose the rotation of the shaft in a first direction. The method further includes controlling a flow of the fluid from the second chamber of the cylinder to the first chamber of the cylinder to oppose the rotation of the shaft in a second direction opposite to the first direction.

Other features and aspects of this disclosure will be apparent from the following description and the accompanying drawings.

DETAILED DESCRIPTION

Figure 1:
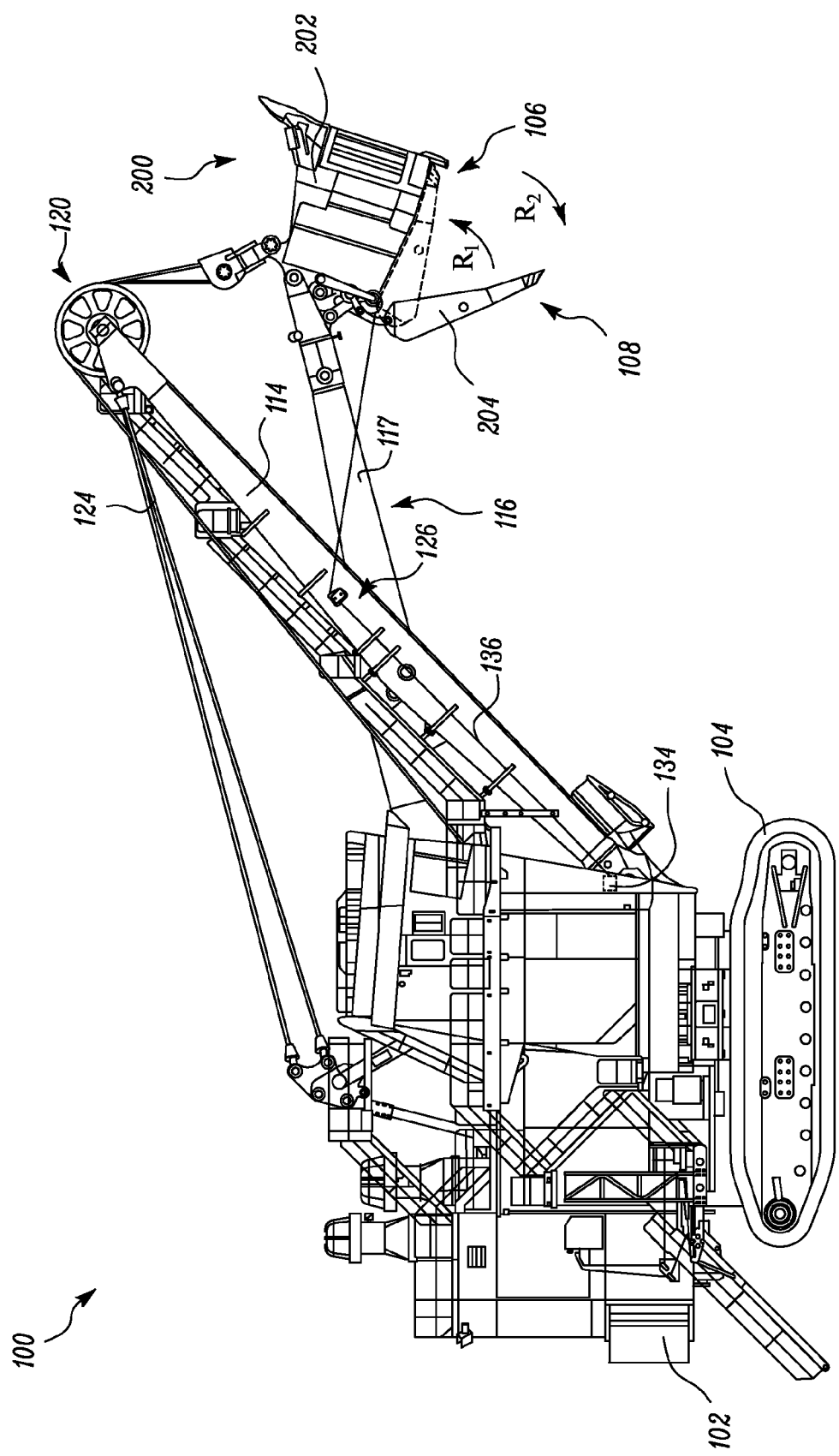
FIG. 1 is a side view of an exemplary machine showing a dipper system having a dipper door, according to an embodiment of the present disclosure.

Wherever possible, the same reference numbers will be used throughout the drawings to refer to the same or the like parts. Referring to FIG. 1, an exemplary machine 100 is illustrated, according to an embodiment of the present disclosure. The machine 100 is embodied as a rope shovel. Various embodiments of the present disclosure are described with reference to a rope shovel as the machine 100. However, the present disclosure may also be applicable to other types of machines such as, but not limited to, a hydraulic shovel and a dragline excavator.

The machine 100 includes a frame 102 that is configured to mount and/or support various components of the machine 100. The frame 102 is rotatably supported on a set of ground engaging members, for example, tracks 104 that are configured to propel the machine 100 forward or backward on ground. The tracks 104 may also be configured to turn the machine 100 by varying a speed and/or a direction of each of the tracks 104 relative to each other. Further, the machine 100 may be configured to move between a loading position 106 and an unloading position 108 for receiving and dumping the material respectively as the frame 102 swings relative to the tracks 104.

The machine 100 may also include a boom 114 extending upwardly and outwardly from the frame 102. The machine 100 may also includes a crowd mechanism 116 and a hoist mechanism 120 provided on the boom 114. The crowd mechanism 116 includes a handle 117 that is configured to slidably move with respect to the boom 114. The hoist mechanism 120 may include a winch (not shown), a pulley 122 and a hoist cable 124. The hoist cable 124 is connected to the winch at one end.

Figure 2:
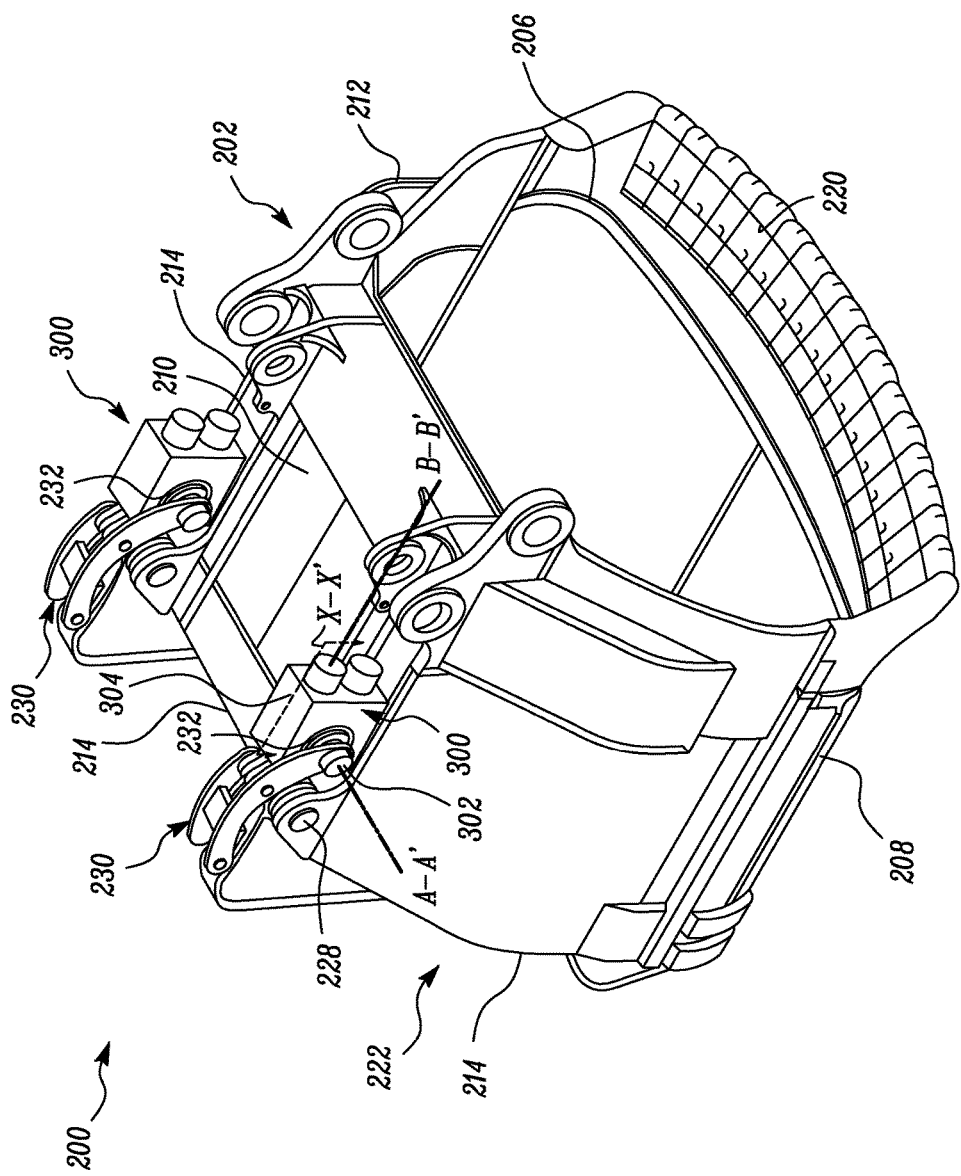
FIG. 2 is a perspective view of the dipper system having a snubber, according to an embodiment of the present disclosure.

Referring now to FIGS. 1 and 2, a dipper system 200 for the machine 100 is illustrated, according to an exemplary embodiment. The dipper system 200 may be configured to hold earth and/or other materials that may be loaded into the dipper system 200. The dipper system 200 includes a dipper body 202 and a dipper door 204 that is pivotally coupled to the dipper body 202. In the illustrated embodiment, the dipper system 200 may act as an implement of the machine 100. However, in various other embodiments, other tools having a movable component, such as a grapple may act as the implement.

Further, an other end of the hoist cable 124 extends over the pulley 122 and is connected to the dipper system 200. Based on a rotation of the winch, the cable retracts or extends relative to the winch. Accordingly, the hoist mechanism 120 is configured to raise or lower the dipper system 200 relative to the frame 102. Moreover, the dipper system 200 may extend or retract relative to the frame 102 based on the sliding movement of the handle 117.

The machine 100 may include a dipper trip mechanism 126 that is coupled to the dipper door 204. The dipper trip mechanism 126 may be configured to operate the dipper door 204. The dipper trip mechanism 126 may include a trip motor 134 and a trip cable 136 extending between the trip motor 134 and the dipper door 204. More specifically, the trip cable 136 may be coupled to a locking mechanism (not shown) of the dipper door 204. The locking mechanism may be configured to selectively lock the dipper door 204 to the dipper body 202. The locking mechanism may be any locking mechanism known in the art, such as a latch bar and lever arrangement, and so on. Based on an operation of the trip motor 134, the trip cable 136 retracts and actuates the locking mechanism. Based on an actuation of the locking mechanism, the dipper door 204 may be unlocked to dump the material at the unloading position 108.

The dipper body 202 includes a forward edge 206 and dipper walls 208, 210, 212 having corresponding rearward edges 214. Teeth 220 may be provided on the forward edge 206 to define a cutting edge that cuts into the ground to fill the dipper body 202.

The dipper door 204 may be pivotally connected to the dipper body 202 and abuts the rearward edges 214 of the dipper walls 208, 210, 212 to close a bottom portion 222 of the dipper body 202. The dipper door 204 is configured to move between an open position and a closed position. In the illustrated embodiment, the dipper door 204 is configured to pivot about a pin joint 228 to swing between the open position and the closed position. The dipper door 204 in the open position may be rotated in a direction R1 to reach the closed position. Similarly, the dipper door 204 in the closed position may swing away from the bottom portion 222 in a direction R2 toward the open position to discharge the load in the dipper body 202.

The machine 100 includes a snubber 300 that may be configured to dampen a swinging motion of a movable component of an implement. In the illustrated embodiment, the snubber 300 may be configured to dampen a swinging motion of the dipper door 204, as the dipper door 204 swings between the open and closed positions. In the illustrated embodiment, two of the snubbers 300 are coupled to the dipper system 200. Moreover, the snubbers 300 are mounted on opposing ends of the rearward edges 214. Therefore, the snubbers 300 may dampen the swinging motion at respective ends of the dipper door 204. Although two snubbers 300 is shown coupled to the dipper system 200, it may be envisioned to use any number of snubbers that may coupled to the dipper system 200 by suitable linkages.

The snubber 300 may be coupled to the dipper system 200 by a linkage assembly 230. In the illustrated embodiment of FIG. 2, the linkage assembly 230 is connected to a shaft 302 that defines a longitudinal axis A-A'. The linkage assembly 230 may be configured to transmit a movement of the dipper door 204 to the shaft 302. The shaft 302 may be configured to rotate about the axis A-A' in a first direction D1 while the dipper door 204 moves in the direction R1, i.e., moving from the open position to the closed position. Further, the shaft 302 may be configured to rotate about the axis A-A' in a second direction D2 that is opposite to the first direction D1, while the dipper door 204 moves in the direction R2, i.e., moving from a closed position to the open position.

It should be noted that the linkage assembly 230 illustrated is exemplary in nature and hence non-limiting of this disclosure. Therefore it may be envisioned to use any other appropriate linkage configurations to transmit an opening/closing movement of the dipper door 204 to a rotation of the shaft 302.

The snubber 300 includes a housing 304 that is configured to be mounted on the dipper system 200. The shaft 302 is rotatably received within the housing 304 and may be operatively coupled to the dipper door 204 via the linkage assembly 230. In an embodiment, a bearing 232 (shown in FIG. 2) may be disposed between the housing 304 and the shaft 302. The bearing 232 may enable rotation of the shaft 302 relative to the housing 304. In an example, the bearing 232 may be a roller bearing.

Figure 3:
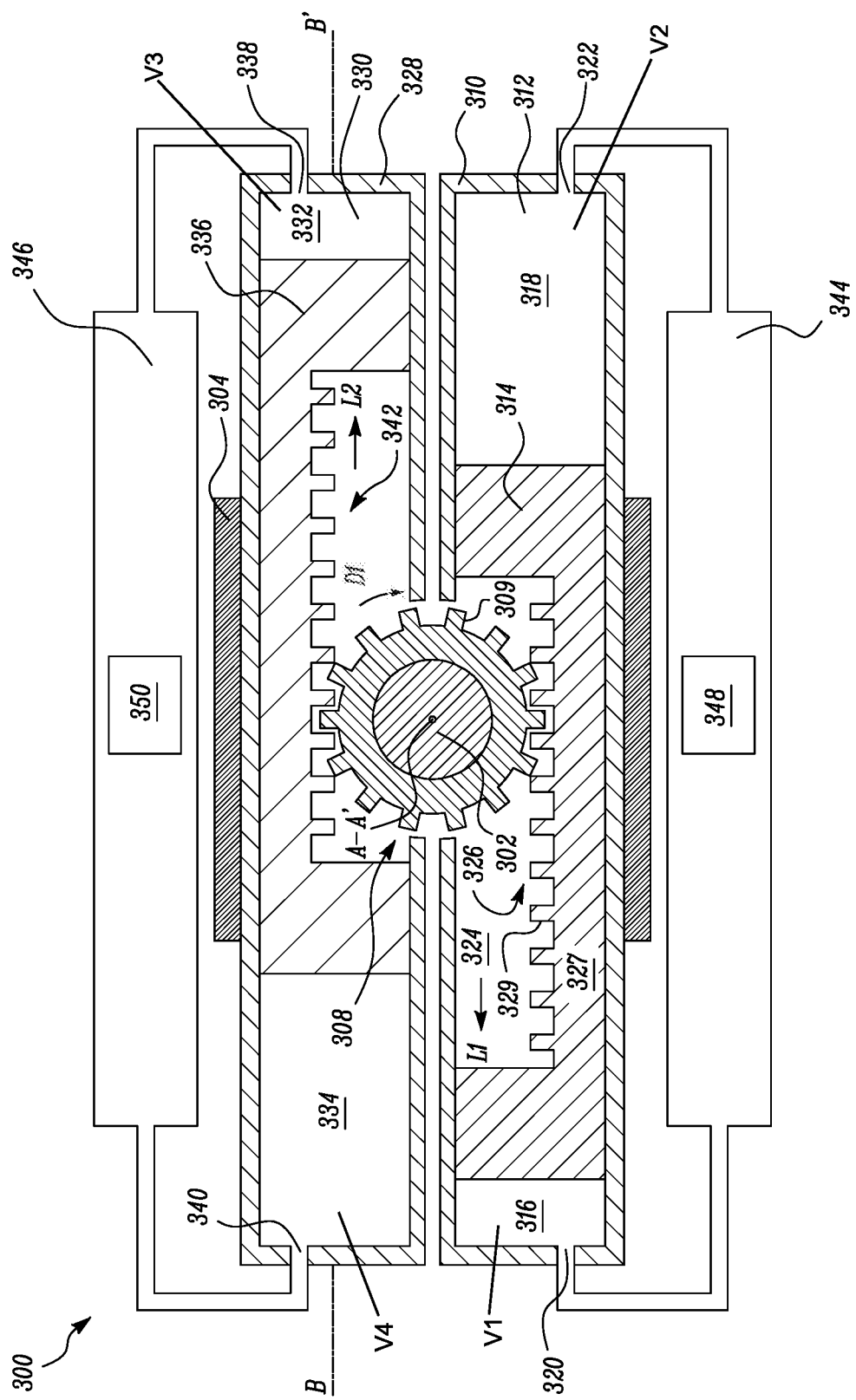
FIG. 3 is a sectional view of the snubber taken along line X-X' of FIG. 2, according to an embodiment of the present disclosure.
Figure 4:
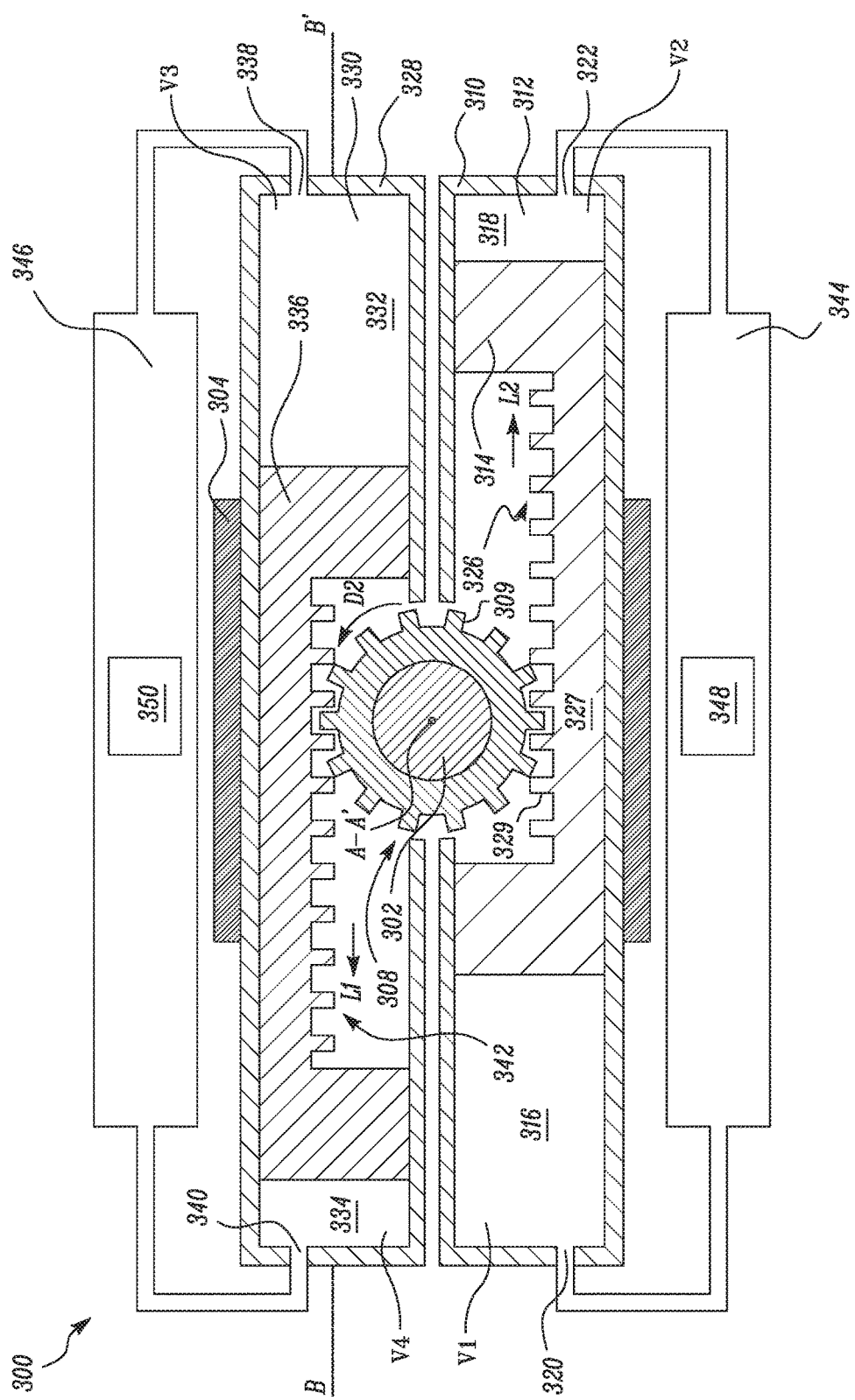
FIG. 4 is a sectional view of the snubber of FIG. 2 in a different configuration.

Referring now to FIGS. 3 and 4, a pinion 308 is coupled to the shaft 302 such that an axis of the pinion 308 aligns with the axis A-A'. The pinion 308 may be a round gear having multiple teeth 309. In an example, the pinion 308 may be a spur gear. Further, a rotation of the shaft 302 about the axis A-A' imparts rotational motion to the pinion 308 about the axis A-A'.

The snubber 300 also includes a first cylinder 310 that is at least partly disposed within the housing 304. The first cylinder 310 defines a central axis B-B' that is substantially perpendicular to the axis A-A' of the shaft 302. The first cylinder 310 also defines a cavity 312 that is configured to slidably receive a first piston 314 therein. The first piston 314 is configured to divide the cavity 312 into a first chamber 316 and a second chamber 318. The first cylinder 310 further defines a first port 320 that is in fluid communication with the first chamber 316 and a second port 322 that is in fluid communication with the second chamber 318. Volumes V1, V2 of the first and second chambers 316, 318 may depend on a position of the first piston 314 with respect to the first cylinder 310. The first piston 314 may also define an opening 324 to receive the pinion 308 therein.

The snubber 300 further includes a first rack 326 that is configured to engage with the pinion 308. The first rack 326 may be disposed substantially parallel to the axis B-B'. Further, the first rack 326 is coupled to the first piston 314. The first rack 326 is a linear member having multiple teeth 329 that are disposed along a length thereof. In the illustrated embodiment, the first rack 326 is disposed on an internal surface 327 of the first piston 314. Therefore, the first rack 326 faces the pinion 308. Moreover, the teeth 329 of the first rack 326 are configured to engage with the teeth of the pinion 308 such that a rotational movement of the pinion 308 is converted to a linear movement of the first rack 326. With such an arrangement, a rotational motion of the shaft 302 that is coupled to the pinion 308 may be converted into a linear movement of the first piston 314 that is coupled to the first rack 326. As illustrated in FIG. 3, while the shaft 302 rotates in the first direction D1, the first piston 314 linearly moves in a direction L1 that is substantially parallel to the axis B-B'.

In an embodiment, the snubber 300 may also include a second cylinder 328 defining a cavity 330, an associated second piston 336, and a second rack 342, that are substantially similar to the first cylinder 310, the first piston 314, and the first rack 326. Further, the second cylinder 328 may also define first and second ports 338, 340 similar to the first cylinder 310. Moreover, the second piston 336 may divide the cavity 330 into first and second chambers 332, 334 of volumes V3, and V4 respectively. As shown in FIG. 3, the second cylinder 328 may be positioned relative to the first cylinder 310 such that the first and second racks 326, 342 face each other with the pinion 308 disposed therebetween. With such an arrangement, the pinion 308 may be configured to engage with both the first and second racks 326, 342.

As illustrated in FIG. 3, rotation of the pinion 308 and the shaft 302 in the first direction D1 during opening of the dipper door 204, causes the first piston 314 to move linearly in the direction L1, while the second piston 336 moves linearly in a direction L2 that is opposite to the direction L1. As illustrated in FIG. 4, rotation of the pinion 308 and the shaft 302 in the second direction D2, i.e., during closing of the dipper door 204, causes the first piston 314 to move linearly in the direction L2, while the second piston 336 moves linearly in a direction L1. Such opposite movement of the first and second racks 326, 342 may balance at least some of forces and/or torques generated during operation of the snubber 300.

Therefore, as the first and second pistons 314, 336 moves in the directions L1, L2 based on the rotational movement of the shaft 302, volumes V1, V3 and V2, V4 of the corresponding first chambers 316, 332 and the second chambers 318, 334 may vary. Moreover, a fluid may tend to flow between the first chambers 316, 332 towards the second chambers 318, 334 through the respective first and second ports 320, 338 and 322, 340 based on changes in the volumes V1, V3 and V2, V4 of the first chambers 316, 332 and second chambers 318, 334. The flow of the fluid between the first chambers 316, 332 and the second chambers 318, 334 may be controlled so as to oppose the rotation of the shaft 302 in the first and second directions D1, D2.

Accordingly, the snubber 300 includes a first hydraulic device 344 and a second hydraulic device 346 that are configured to control the flow of fluid between the corresponding first chambers 316, 332 and the second chambers 318, 334. The first hydraulic device 344 may include a first manifold (not shown). Similarly, the second hydraulic device 346 may include a second manifold (not shown). The first and second manifolds may be releasably coupled to the housing 304 of the snubber 300.

In another embodiment, the first and second hydraulic device 344, 346 may be disposed in a single manifold. Alternatively, the snubber 300 may include a single hydraulic device that is configured to control the flow of fluid between the first and the second chambers 316, 332 and 318, 334 respectively.

The first hydraulic device 344 is explained in detail herein. However, it may be contemplated to apply the concepts of the first hydraulic device 344 to the second hydraulic device 346.

The first hydraulic device 344 may be in fluid communication with the cavity 312 of the first cylinder 310. Therefore, as the volume V1 of the first chamber 316 or the volume V2 of the second chamber 318 decreases, the fluid flows to the first hydraulic device 344. The fluid flow from the first hydraulic device 344 to the first or second chamber 316, 318 may be controlled so as to increase pressure inside the corresponding first or second chamber 316, 318. Such increased pressure may provide necessary torque to oppose the rotation of the shaft 302, and thereby the rotation of the dipper door 204.

In an example, during opening of the door, the shaft 302 may rotate in the first direction D1 causing the first piston 314 to move linearly in the direction L1. As such, the volume V1 of the first chamber 316 decreases and the fluid flows from the first chamber 316 to the first hydraulic device 344. The first hydraulic device 344 may control the flow of the fluid to the second chamber 318 thereby increasing a pressure inside the first chamber 316. Such increased pressure may exert force on the first piston 314 that converts to an opposing torque on the shaft 302. The torque may oppose the rotation of the shaft 302 in the first direction D1. Similarly, during closing of the dipper door 204, the fluid flow from the second chamber 318 to the first chamber 316 may be controlled so as to oppose rotation of the shaft 302 in the second direction D2. Such opposition to the rotation of the shaft 302 may be transmitted to the dipper door 204 through the linkage mechanism assembly 230 thereby opposing rotation of the dipper door 204.

Figure 5:
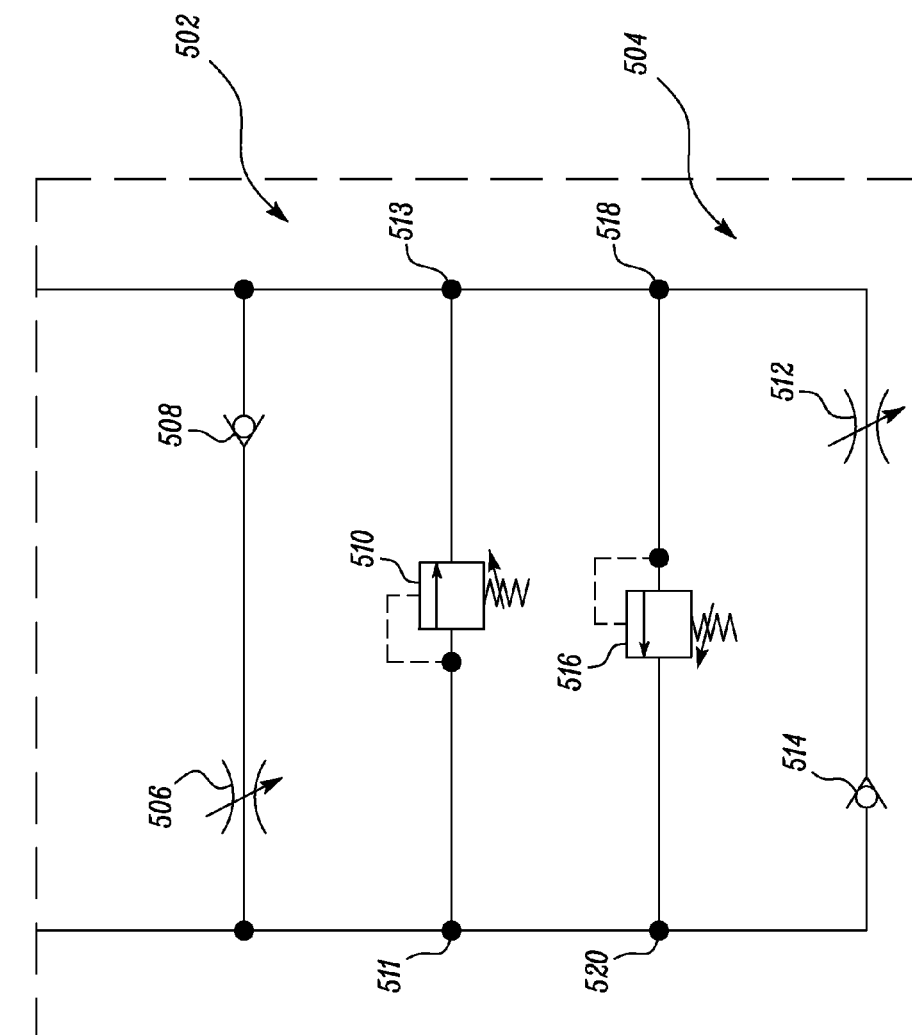
FIG. 5 is a schematic diagram of a hydraulic circuit used with the snubber, according to an embodiment of the present disclosure.

Referring to FIG. 5, an exemplary hydraulic circuit 500 that may be used in the first and second hydraulic device 344 and 346 is schematically illustrated. The hydraulic circuit 500 includes a first flow control module 502 and a second flow control module 504. The first flow control module 502 and the second flow control module 504 may have appropriate hydraulic lines in fluid communication with the first and second ports 320, 338 and 322, 340, respectively. Accordingly, the fluid in the housing 304 may tend to flow between the first and second chambers 316, 332 and 318, 334 by passing through the hydraulic lines of the hydraulic circuit 500.

The first flow control module 502 may be configured to control a flow from the first chamber 316 to the second chamber 318 to oppose the rotation of the shaft 302 in the first direction D1, while the second flow control module 504 is configured to control a flow from the second chamber 318 to the first chamber 316 to oppose the rotation of the shaft 302 in the second direction D2.

The first flow control module 502 may include a first flow control valve 506 and a first check valve 508. The first flow control valve 506 is in fluid communication with the first chamber 316 of the first cylinder 310 and is configured to restrict a flow of the fluid therethrough. Therefore, as the fluid flows from the first chamber 316 to the first flow control module 502, the first flow control valve 506 allows only a portion of the fluid to flow therethrough.

The first check valve 508 is in fluid communication with the first flow control valve 506 and is configured to allow a unidirectional flow from the first flow control valve 506 to the second chamber 318. In the illustrated embodiment, the first check valve 508 is configured to allow the flow in a direction from the first flow control valve 506 to the first chamber 316 and restricts flow in an opposite direction.

The first flow control module 502 may also include a first pressure relief valve 510 that may be disposed in parallel to the first flow control valve 506 and the first check valve 508. As shown in FIG. 5, the first pressure relief valve 510 has an inlet end 511 that is in fluid communication with the first chamber 316 and an outlet end 513 that is in fluid communication with the second chamber 318. The first pressure relief valve 510 is configured to allow a flow of the fluid from the inlet end 511 to the outlet end 513 if a pressure at the inlet end 511 exceeds a first predetermined threshold. Due to the restriction provided by the first flow control valve 506, a pressure at the inlet end 511 may increase as the first piston 314 moves in the direction L1. Therefore, when the pressure at the inlet end 511 exceeds the first predetermined threshold, the fluid flows from the first chamber 316 to the second chamber 318 through the first pressure relief valve 510. As such, the pressure inside the first chamber 316 may be decreased.

Due to the increase in pressure to the first predetermined threshold, the fluid exerts a force on the first piston 314 such that the movement of the first piston 314 in the direction L1 is opposed. The force translates to a torque on the shaft 302. The torque is in a direction opposite to the first direction D1 of the shaft 302, and hence the rotational speed of the shaft 302 decreases. The linkage assembly 230 may communicate such decreased speed to the dipper door 204, thereby decreasing the swinging speed of the dipper door 204.

Similarly, when the dipper door 204 is moving in the direction R2, the shaft 302 may rotate in the second direction D2. Accordingly, the first piston 314 moves in the direction L2 thereby decreasing the volume V2 of the second chamber 318. Therefore the fluid may tend to flow from the second chamber 318 to the first chamber 316 through the respective second and first ports 322, 320. The second fluid flow control module 504 may be configured to control a flow of fluid from the second chamber 318 to the first chamber 316 thereby increasing the pressure inside the second chamber 318. Such increased pressure may exert force on the first piston 314 that converts to an opposing torque on the shaft 302. The torque may oppose the rotation of the shaft 302 in the second direction D2.

The second flow control module 504 may be substantially similar to the first flow control module 502. However, the first flow control module 502 may be operable to control the flow from the first chamber 316 to the second chamber 318 to oppose the rotation of the shaft 302 in the first direction D1, while the second flow control module 504 may be operable to control the flow from the second chamber 318 to the first chamber 316 so as to oppose the rotation of the shaft 302 in the second direction D2.

Accordingly, the second flow control module 504 may include a second flow control valve 512 and a second check valve 514. The second flow control valve 512 is in fluid communication with the second chamber 318 and is configured to restrict a flow of the fluid therethrough. Therefore, as the fluid flows from the second chamber 318 to the second flow control module 504, the second flow control valve 512 allows only a portion of the fluid to flow therethrough.

The second check valve 514 is in fluid communication with the second flow control valve 512 and is configured to allow a unidirectional flow from the second flow control valve 512 to the first chamber 316. In the illustrated embodiment, the second check valve 514 is configured to allow the flow in a direction from the second flow control valve 512 to the second chamber 318 and restricts flow in an opposite direction.

The second flow control module 504 may also include a second pressure relief valve 516 that may be disposed in parallel to the second flow control valve 512 and the second check valve 514. As shown in FIG. 5, the second pressure relief valve 516 has an inlet end 518 that is in fluid communication with the second chamber 318 and an outlet end 520 that is in fluid communication with the first chamber 316. The second pressure relief valve 516 is configured to allow a flow of the fluid from the inlet end 518 to the outlet end 520 if a pressure at the inlet end 518 exceeds a second predetermined threshold. In an embodiment, the first predetermined threshold may be equal to the first predetermined threshold. Operation of various components of the second flow control module 504 may be substantially similar to operation of the equivalent components of the first flow control module 502.

It may be apparent to a person ordinarily skilled in the art that the second flow control module 504 may not function when the first piston 314 moves in the direction L1. The second check valve 514 may prevent flow of the fluid to the second check valve 514 from the first chamber 316. Further, the second pressure relief valve 516 may not allow flow from the first chamber 316 to the second chamber 318. Similarly, the first flow control module 502 may not function when the first piston 314 moves in the direction L2.

In an embodiment, the first hydraulic device 344 may include one or more accumulators (not shown) that are configured to maintain the fluid at a predetermined pressure. Each of the accumulators may be in fluid communication with the hydraulic circuit 500, and one of the first and second chambers 316, 318. The accumulator may receive a fluid from the corresponding first and second chambers 316, 318 when a volume of the fluid increases. The accumulator may include a pressurized gas (for example, nitrogen) that may be used to maintain a predetermined pressure therein.

It should be noted that the hydraulic circuit 500 illustrated in FIG. 5, is exemplary in nature and hence non-limiting of this disclosure. Any other appropriate hydraulic circuit may be used as an alternative to the circuit of FIG. 5.

In an embodiment, the snubber 300 may not include the second cylinder 328, the second piston 336 and the second hydraulic device 346. In such a case, the snubber 300 may dampen the swinging motion of the dipper door 204 by operation of the first cylinder 310, the first piston 336, the first hydraulic device 344 and other associated components.

INDUSTRIAL APPLICABILITY

Figure 6:
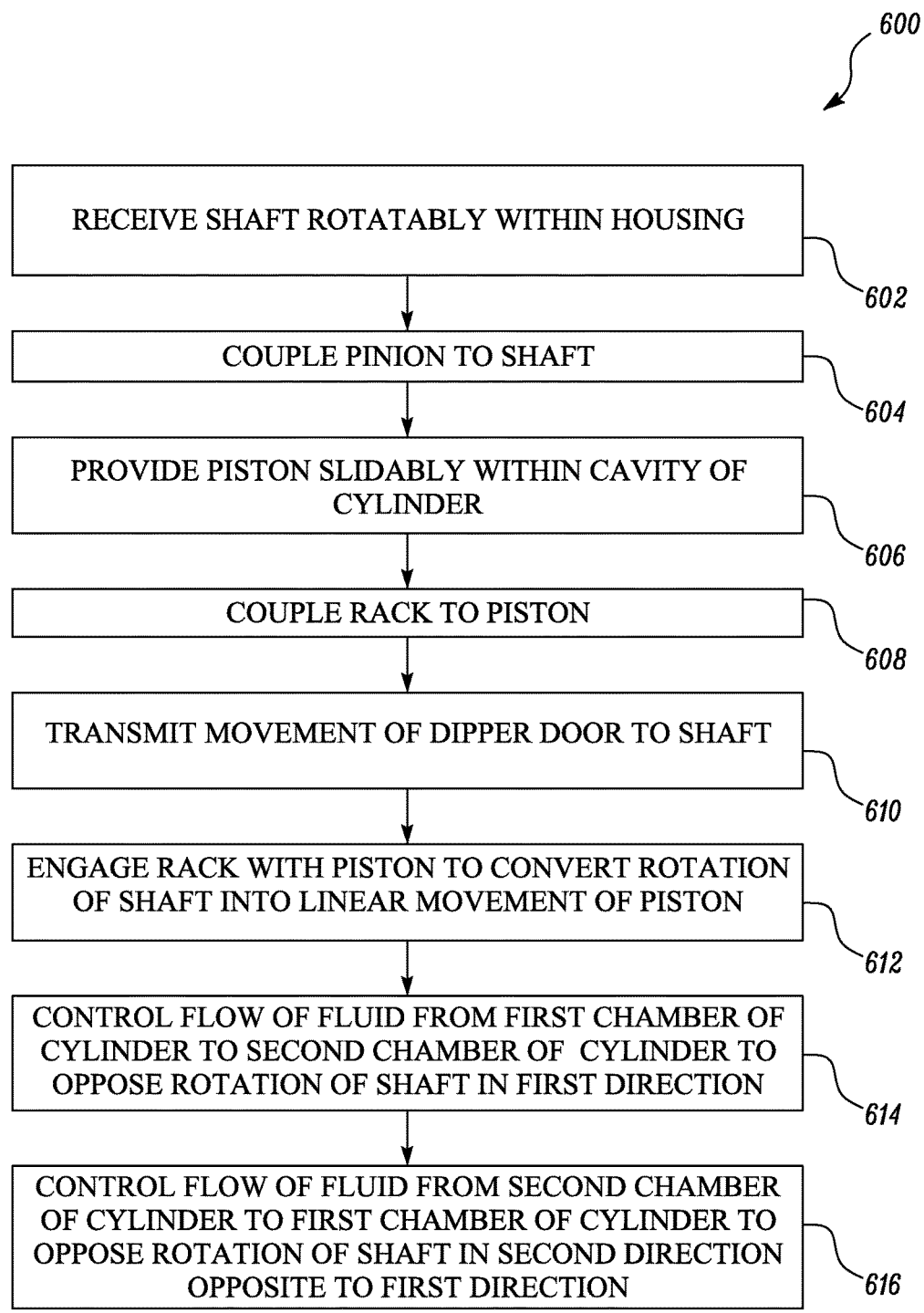
FIG. 6 is a flowchart of a method for damping a movement of the dipper door, according to an embodiment of the present disclosure.

The present disclosure relates to the dipper system 200 including the snubbers 300 and a method 600 of damping a movement of the dipper door 204. Referring to FIG. 6, at step 602, the method 600 includes receiving the shaft 302 rotatably within the housing 304. The shaft 302 is operatively coupled to the dipper door 204. At step 604, the method 600 includes coupling the pinion 308 to the shaft 302. At step 606, the method 600 includes receiving the first piston 314 slidably within the cavity 312 of the first cylinder 310. The first piston 314 divides the cavity 312 into the first chamber 316 and the second chamber 318. At step 606, the method 600 may also include receiving the second piston 336 slidably within the cavity 330 of the second cylinder 328. The second piston 336 divides the cavity 330 into the first chamber 332 and the second chamber 334.

At step 608, the method 600 includes coupling the first rack 326 to the first piston 314. At step 608, the method 600 may also include coupling the second rack 342 to the second piston 336. At step 610, the method 600 includes transmitting the movement of the dipper door 204 to the shaft 302. At step 612, the method 600 includes engaging the first rack 326 with the pinion 308 to convert a rotation of the shaft 302 into a linear movement of the first piston 314. The method 600 may also include transmitting the movement of the dipper door 204 to the shaft 302. At step 612, the method 600 includes engaging the second rack 342 with the pinion 308 to convert a rotation of the shaft 302 into a linear movement of the second piston 336. Moreover, a direction of the linear movement of the second piston 336 is opposite to a direction of the linear movement of the first piston 314.

At step 614, the method 600 includes controlling the flow of a fluid from the first chamber 316 of the first cylinder 310 to the second chamber 318 of the first cylinder 310 to oppose the rotation of the shaft 302 in the first direction D1. At step 614, the method 600 may also include controlling the flow of a fluid from the first chamber 332 of the second cylinder 328 to the second chamber 334 of the second cylinder 328 to further oppose the rotation of the shaft 302 in the first direction D1.

At step 616, the method 600 includes controlling the flow of the fluid from the second chamber 318 of the first cylinder 310 to the first chamber 316 of the first cylinder 310 to oppose the rotation of the shaft 302 in the second direction D2 that is opposite to the first direction D1. At step 616, the method 600 may also include controlling the flow of the fluid from the second chamber 334 of the second cylinder 328 to the first chamber 332 of the second cylinder 328 to oppose the rotation of the shaft 302 in the second direction D2.

The snubber 300 according to the present disclosure, may be retrofitted onto any rope shovel or other machines having an implement with a movable door. The snubber 300 may reduce the swinging speed of the dipper door 204 by opposing the rotation of the shaft 302 that is operatively coupled to the dipper door 204. Additionally, use of the first and second hydraulic devices 344, 346 may minimize mechanical couplings and/or friction that may result in wear. Therefore, the snubber 300 may have reduced maintenance costs. The snubber 300 may also have reduced frequency of maintenance, thereby decreasing machine downtime and associated costs. Moreover, the snubber 300 may have an increased service life and reliability.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A snubber for a machine, the snubber comprising:
   a housing configured to be mounted on an implement of the machine;
   a shaft rotatably received within the housing and operatively coupled to a movable component of the implement;
   a pinion coupled to the shaft,
   a cylinder at least partly disposed within the housing, the cylinder defining a cavity therein;
   a piston slidably received within the cylinder, the piston dividing the cavity of the cylinder into a first chamber and a second chamber;
   a rack coupled to the piston, the rack configured to engage with the pinion to convert a rotation of the shaft into a linear movement of the piston; and
   a hydraulic device in fluid communication with the cavity of the cylinder, the hydraulic device configured to control a flow of a fluid between the first chamber and the second chamber to oppose the rotation of the shaft.

2. The snubber of claim 1, the hydraulic device comprising a first flow control module configured to control a flow from the first chamber to the second chamber to oppose the rotation of the shaft in a first direction.

3. The snubber of claim 2, the hydraulic device further comprising a second flow control module configured to control a flow from the second chamber to the first chamber to oppose the rotation of the shaft in a second direction opposite to the first direction.

4. The snubber of claim 2, the first flow control module comprising:
   a first flow control valve in fluid communication with the first chamber of the cylinder, the first flow control valve configured to restrict a flow of the fluid therethrough,
   a first check valve in fluid communication with the first flow control valve, the first check valve configured to allow a unidirectional flow from the first flow control valve to the second chamber of the cylinder; and
   a first pressure relief valve disposed in parallel to the first flow control valve and the first check valve, the first pressure relief valve having an inlet end in fluid communication with the first chamber and an outlet end in fluid communication with the second chamber, wherein the first pressure relief valve is configured to allow a flow of the fluid from the inlet end to the outlet end if a pressure at the inlet end exceeds a first predetermined threshold.

5. The snubber of claim 4, wherein the hydraulic device further comprises a second flow control module configured to control a flow from the second chamber to the first chamber to oppose the rotation of the shaft in a second direction opposite to the first direction, and wherein the second flow control module comprises:
- a second flow control valve in fluid communication with the second chamber of the cylinder, the second flow control valve configured to restrict a flow of the fluid therethrough,
- a second check valve in fluid communication with the second flow control valve, the second check valve configured to allow a unidirectional flow from the second flow control valve to the first chamber of the cylinder; and
- a second pressure relief valve disposed in parallel to the second flow control valve and the second check valve, the second pressure relief valve having an inlet end in fluid communication with the second chamber and an outlet end in fluid communication with the first chamber, wherein the second pressure relief valve is configured to allow a flow of the fluid from the inlet end to the outlet end if a pressure at the inlet end exceeds a second predetermined threshold.

6. The snubber of claim 3, the hydraulic device further comprising a manifold configured to receive the first control module and the second control module therein.

7. The snubber of claim 1, the piston defining an opening configured to receive the pinion therein, and wherein the rack is disposed on an internal surface of the piston facing the pinion.

8. The snubber of claim 1, further comprising:
- a second cylinder at least partly disposed within the housing, the second cylinder defining a cavity therein; and
- a second piston slidably received within the second cylinder, the second piston dividing the cavity of the second cylinder into a first chamber and a second chamber;
- a second rack coupled to the second piston, the second rack configured to engage with the pinion to convert the rotation of the shaft into a linear movement of the second piston;
- wherein the hydraulic device in fluid communication with the cavity of the second cylinder, the hydraulic device configured to control a flow of the fluid between the first chamber of the second cylinder and the second chamber of the second cylinder to oppose the rotation of the shaft.

9. The snubber of claim 8, wherein a direction of the linear movement of the second piston is opposite to a direction of the linear movement of the first piston.

10. The snubber of claim 1, wherein the cylinder further defines a first port in fluid communication with the first chamber and a second port in fluid communication with the second chamber, wherein the hydraulic device is in fluid communication with the first port and the second port.

11. The snubber of claim 1, further comprising a bearing disposed between the shaft and the housing.

12. A dipper system for a machine, the dipper system comprising:
- a dipper body;
- a dipper door coupled to the dipper body and configured to move between an open position and a closed position; and
- a snubber disposed on the dipper body, the snubber comprising:
  - a housing configured to be mounted on the dipper system of the machine;
  - a shaft rotatably received within the housing and operatively coupled to the dipper door;
  - a pinion coupled to the shaft,
  - a cylinder at least partly disposed within the housing, the cylinder defining a cavity therein;
  - a piston slidably received within the cylinder, the piston dividing the cavity of the cylinder into a first chamber and a second chamber;
  - a rack coupled to the piston, the rack configured to engage with the pinion to convert a rotation of the shaft into a linear movement of the piston; and
  - a hydraulic device in fluid communication with the cavity of the cylinder, the hydraulic device configured to control a flow of a fluid between the first chamber and the second chamber to oppose the rotation of the shaft.

13. The dipper system of claim 12, further comprising a linkage assembly configured to transmit a movement of the dipper door to the shaft.

14. The dipper system of claim 12, the hydraulic device comprising a first flow control module configured to control a flow from the first chamber to the second chamber to oppose the rotation of the shaft in a first direction.

15. The dipper system of claim 14, the hydraulic device further comprising a second flow control module configured to control a flow from the second chamber to the first chamber to oppose the rotation of the shaft in a second direction opposite to the first direction.

16. The dipper system of claim 14, the first flow control module comprising:
- a first flow control valve in fluid communication with the first chamber of the cylinder, the first flow control valve configured to restrict a flow of the fluid therethrough,
- a first check valve in fluid communication with the first flow control valve, the first check valve configured to allow a unidirectional flow from the first flow control valve to the second chamber of the cylinder; and
- a first pressure relief valve disposed in parallel to the first flow control valve and the first check valve, the first pressure relief valve having an inlet end in fluid communication with the first chamber and an outlet end in fluid communication with the second chamber, wherein the first pressure relief valve is configured to allow a flow of the fluid from the inlet end to the outlet end if a pressure at the inlet end exceeds a first predetermined threshold.

17. The dipper system of claim 16, wherein the hydraulic device further comprises a second flow control module configured to control a flow from the second chamber to the first chamber to oppose the rotation of the shaft in a second direction opposite to the first direction and wherein the second flow control module comprises:
- a second flow control valve in fluid communication with the second chamber of the cylinder, the second flow control valve configured to restrict a flow of the fluid therethrough,
- a second check valve in fluid communication with the second flow control valve, the second check valve configured to allow a unidirectional flow from the second flow control valve to the first chamber of the cylinder; and
- a second pressure relief valve disposed in parallel to the second flow control valve and the second check valve, the second pressure relief valve having an inlet end in fluid communication with the second chamber and an outlet end in fluid communication with the first chamber, wherein the second pressure relief valve is configured to allow a flow of the fluid from the inlet end to the outlet end if a pressure at the inlet end exceeds a second predetermined threshold.

18. The dipper system of claim 15, the hydraulic device further comprising a manifold configured to receive the first control module and the second control module therein.

19. The dipper system of claim 12, the piston defining an opening configured to receive the pinion therein, and wherein the rack is disposed on an internal surface of the piston facing the pinion.

20. A method of damping a movement of a dipper door, the method comprising:
- receiving a shaft rotatably within a housing, the shaft operatively coupled to the dipper door;
- coupling a pinion to the shaft;
- providing a piston slidably within a cavity of a cylinder, the piston dividing the cavity of the cylinder into a first chamber and a second chamber;
- coupling a rack to the piston;
- transmitting the movement of the dipper door to the shaft;
- engaging the rack with the piston to convert a rotation of the shaft into a linear movement of the piston;
- controlling a flow of a fluid from the first chamber of the cylinder to the second chamber of the cylinder to oppose the rotation of the shaft in a first direction; and
- controlling a flow of the fluid from the second chamber of the cylinder to the first chamber of the cylinder to oppose the rotation of the shaft in a second direction opposite to the first direction.

* * * * *